United States Patent
Fernandes

(10) Patent No.: US 9,967,345 B2
(45) Date of Patent: May 8, 2018

(54) SPLIT SCREEN TELECONFERENCING

(71) Applicant: MobiTV, Inc., Emeryville, CA (US)

(72) Inventor: Cedric Fernandes, San Ramon, CA (US)

(73) Assignee: MobiTV, Inc., Emeryville, CA (US)

(*) Notice: Subject to any disclaimer, the term of this patent is extended or adjusted under 35 U.S.C. 154(b) by 164 days.

(21) Appl. No.: 14/506,515

(22) Filed: Oct. 3, 2014

(65) Prior Publication Data

US 2016/0099980 A1 Apr. 7, 2016

(51) Int. Cl.
*H04L 29/08* (2006.01)
*H04L 29/06* (2006.01)
*H04L 12/18* (2006.01)

(52) U.S. Cl.
CPC ........ *H04L 67/141* (2013.01); *H04L 12/1822* (2013.01); *H04L 65/1006* (2013.01); *H04L 65/1009* (2013.01); *H04L 65/1069* (2013.01); *H04L 65/4038* (2013.01); *H04L 65/4053* (2013.01); *H04L 67/025* (2013.01); *H04L 67/04* (2013.01); *H04L 67/10* (2013.01); *H04L 67/143* (2013.01); *H04L 67/24* (2013.01); *H04L 67/303* (2013.01)

(58) Field of Classification Search
CPC . H04L 12/18; H04L 65/1006; H04L 65/1009; H04L 65/1069; H04L 65/4038; H04L 65/4053; H04L 67/10; H04L 67/141
See application file for complete search history.

(56) References Cited

U.S. PATENT DOCUMENTS

| | | | |
|---|---|---|---|
| 8,233,607 B1* | 7/2012 | Ambrose | H04M 3/42212 379/201.01 |
| 8,537,740 B2* | 9/2013 | Markel | H04L 29/06027 370/328 |
| 8,782,270 B2* | 7/2014 | Sathianathan | H04N 21/2343 709/204 |
| 9,043,474 B2* | 5/2015 | Schleifer | H04L 12/1818 709/227 |
| 9,210,198 B2* | 12/2015 | Efrati | H04L 65/403 |
| 2004/0133641 A1* | 7/2004 | McKinnon | H04M 3/42365 709/204 |
| 2004/0247103 A1* | 12/2004 | Tanimoto | H04M 3/42374 379/201.01 |
| 2008/0126549 A1* | 5/2008 | Khanchandani | H04L 65/1069 709/227 |

(Continued)

OTHER PUBLICATIONS

"U.S. Appl. No. 14/515,476, Examiner Interview Summary dated Jun. 8, 2017", 3 pages.

(Continued)

*Primary Examiner* — Uzma Alam
(74) *Attorney, Agent, or Firm* — Kwan & Olynick LLP

(57) ABSTRACT

Techniques and mechanisms described herein facilitate conducting a teleconference between a remote client device and a teleconference system. According to various embodiments, the teleconference system may include a data input device that receives teleconference data and a teleconference output device that presents teleconference output data. The data input device and the data output device may reside at different network end points. The system identifies the presence of a user on two different devices and leverages the appropriate device for video capture and display.

18 Claims, 5 Drawing Sheets

(56) References Cited

U.S. PATENT DOCUMENTS

| | | | |
|---|---|---|---|
| 2008/0320082 A1* | 12/2008 | Kuhlke | H04L 12/1822 709/205 |
| 2009/0052351 A1 | 2/2009 | James et al. | |
| 2010/0251292 A1 | 9/2010 | Srinivasan et al. | |
| 2011/0066745 A1* | 3/2011 | Olsson | H04N 7/173 709/231 |
| 2011/0249079 A1* | 10/2011 | Santamaria | H04M 7/0057 348/14.02 |
| 2011/0314099 A1* | 12/2011 | Imai | H04L 12/1822 709/204 |
| 2012/0034938 A1* | 2/2012 | Kreitzer | H04L 51/04 455/466 |
| 2012/0050455 A1* | 3/2012 | Santamaria | H04L 61/256 348/14.11 |
| 2012/0066722 A1 | 3/2012 | Cheung et al. | |
| 2013/0040600 A1 | 2/2013 | Reitnour | |
| 2014/0012860 A1 | 1/2014 | Kandur Raja | |
| 2014/0068007 A1 | 3/2014 | O'Gorman | |
| 2015/0009865 A1* | 1/2015 | Sharma | H04L 5/16 370/277 |
| 2016/0077710 A1* | 3/2016 | Lewis | G06F 3/04842 715/716 |
| 2016/0112482 A1 | 4/2016 | Iyengar | |

OTHER PUBLICATIONS

"U.S. Appl. No. 14/515,476, Final Office Action dated Jan. 27, 2017", 15 pages.

"U.S. Appl. No. 14/515,476, Non Final Office Action dated Jun. 30, 2017", 11 pgs.

"U.S. Appl. No. 14/515,476, Non Final Office Action dated Aug. 25, 2016", 16 pages.

* cited by examiner

SPLIT SCREEN TELECONFERENCING

TECHNICAL FIELD

The present disclosure relates to video and/or audio teleconferencing conducted between computing devices via a network.

DESCRIPTION OF RELATED ART

In a video and/or audio teleconference, devices communicate via a network to present video and/or audio input data. For instance, one participant in the teleconference may provide video and/or audio input data via a camera and/or microphone at a computing device. This video and/or audio input data may be transmitted via the network to a different computing device where it is presented. The same procedure may be performed simultaneously in reverse. In this way, the participants in the teleconference may see and/or hear each other at their respective computing devices. Such teleconferences may be conducted via any of various devices. For instance, a participant to a teleconference may communicate via a personal computer, a laptop computer, or a mobile computing device such as a smart phone.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Figure 1:
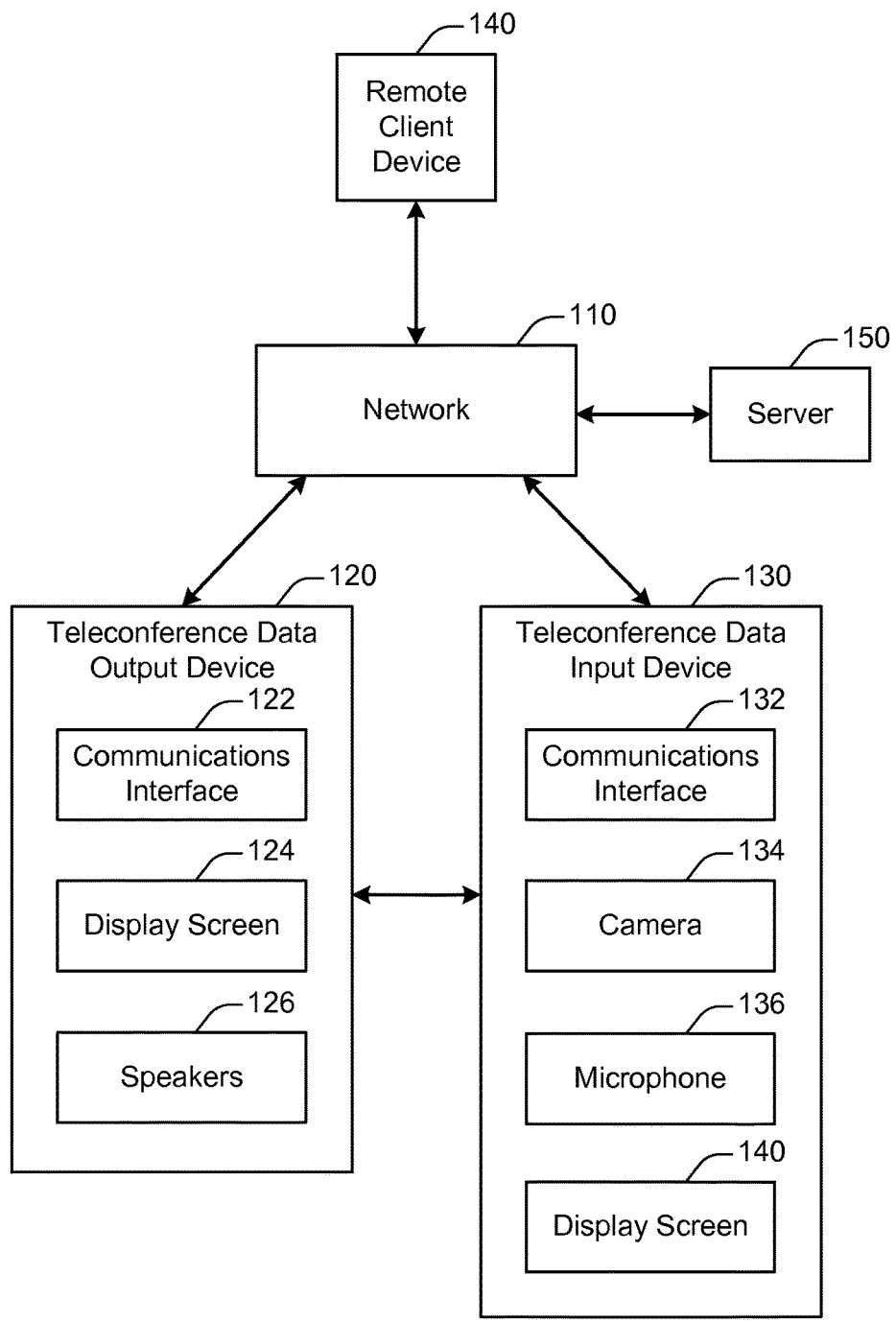
FIG. 1 illustrates an example of a system, configured in accordance with various techniques and mechanisms of the present invention.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular content streams, servers, and encoding mechanisms. However, it should be noted that the techniques of the present invention apply to a wide variety of different content streams, servers, and encoding mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Techniques and mechanisms described herein facilitate the performance of a teleconference between a communications system and a remote client device. The communications system may include at least two teleconference devices, such as a smart television and a smart phone. Input data for the teleconference such as video and/or audio data may be received at one of the teleconference devices, such as the smart phone. Output data for the teleconference such as video and/or audio data received from the remote client device may be presented and a different one of the teleconference devices, such as the smart television. For instance, a user may conduct a teleconference in which a camera and microphone used to receive teleconference data is located on a smart phone, while the video and audio data received from another user is presented on a different device such as a television.

Example Embodiments

In a video and/or audio teleconference, devices communicate via a network to present video and/or audio input data. The teleconference may allow two or more users to exchange unidirectional or bidirectional audio and/or video communications. In a conventional teleconference system, each end point of a teleconference is located at a single device. The device either includes a built-in video camera and/or microphone or connects directly to an external video camera and/or microphone.

According to various embodiments, techniques and mechanisms described herein support a teleconference in which output data received at an end point of a teleconference is presented at one computing device, while input data at the same end point is received at a different computing device. The two computing devices may each be standalone devices including such components as processors, memory, and communications interfaces.

In particular embodiments, a split screen video conference system may allow a user to conduct a teleconference via existing devices. For instance, the user may employ a dedicated display device such as a television to display the video conference data. The user may then employ a separate computing device such as a smart phone, laptop, or tablet that has a camera and/or microphone to provide video and/or audio data for the teleconference.

According to various embodiments, a communications interface may be communicably coupled with a device such as a television. However, the communications interface and the television may lack a microphone, camera, or both. In such a configuration, a user may initiate a video and/or audio teleconference on a different local device such as a mobile phone or tablet computer that has a microphone and/or camera. This local device may be used to capture audio and/or video information for transmitting to a remote device. When the remote device that receives the incoming call responds, the audio and/or video information received from the local device may be presented on the television via the communications interface.

According to various embodiments, if a teleconference call is received at a system configured as described in the preceding paragraph, the incoming video and/or audio transmission received as part of the call may be transferred to the television. At the same time, the outgoing video and/or audio information transmitted to the remote device may be captured at the local device that is separate from the television.

According to various embodiments, a system configured in accordance with techniques described herein may be operable to perform session management of a teleconference in which a single user is associated with two or more end points. For instance, session management may be performed at least in part using a session protocol such as the Session Initiation Protocol (SIP) or H.323. The session protocol may define various characteristics associated with messages sent between communications end points. These characteristics may govern the establishment, termination, and other elements of a teleconference. The protocol may be used for creating, modifying, and/or terminating sessions consisting of one or several media streams.

According to various embodiments, a system configured in accordance with techniques described herein may be operable to perform presence detection. Presence detection refers to techniques in which the availability of a user and the device on which the user is available at a given point in time are determined. Presence detection may facilitate the routing of a call or session to a specific device by an IP Multimedia system (IMS).

In particular embodiments, a system configured in accordance with techniques described herein may employ the SIP for Instant Messaging and Presence Leveraging Extensions (SIMPLE) protocol. The SIMPLE protocol may be used to perform such tasks as registering for presence information and receiving notifications when events occur, sending short messages, and/or managing a session of real-time messages between two or more participants.

In some embodiments, presence detection may be used to determine and maintain a user's availability on two or more devices. Then, the system may route some information, such as video and/or audio information received from remote devices, to one of the devices. At the same time, the system may receive other information, such as video and/or audio information provided from another of the devices. In this way, presence detection may facilitate the implementation of a teleconference in which at least one user is associated with two different network end points.

In some implementations, a teleconferencing service may be implemented in conjunction with a content management service. The content management service may facilitate the interaction of users with various types of content. For instance, the content management service may provide a user interface for managing and accessing content from a number of different content sources. The interface may display content received via a cable or satellite television connection, one or more on-demand-video service providers such as Netflix or Amazon, and/or content accessible on local or network storage locations. In addition, the interface may be used to access this content on any number of content playback devices, such as televisions, laptop computers, tablet computers, personal computers, and mobile phones. At least some of the content may include live audio and/or video streams.

FIG. 1 illustrates a system supporting communication via a network, configured in accordance to one or more embodiments. The system shown in FIG. 1 is configured to allow a user to conduct a video and/or audio teleconference with another user at remote client device 140 over the network 110 via the teleconference data output device 120 and the teleconference data input device 130. In the system shown in FIG. 1, at least a portion of the input data for the teleconference is received at the teleconference input device 130, while at least a portion of the output data for the teleconference is presented at the teleconference data output device 120. The system shown in FIG. 1 also includes a server 150, which may be configured to facilitate at least a portion of the teleconference communications.

According to various embodiments, the remote client device 140 may be any device capable of sending and receiving video and/or audio data via a network. For instance, the remote client device 140 may be a mobile phone, a mobile computing device, a laptop computer, a tablet computer, a smart television, a set top box in communication with a television, or a desktop computer. In particular embodiments, the remote client device 140 may include a teleconference data output device and/or a teleconference data input device arranged in a manner similar to that discussed with respect to the devices 120 and 130. As is discussed with respect to the methods 200 and 300 shown in FIGS. 2 and 3, the remote client device 140 may initiate and/or receive a teleconference request.

According to various embodiments, the network 110 may include any one or more networks capable of conducting teleconference communication with the client device. For instance, the network 110 may include one or more local area networks (LANs), wide area networks (WANs), municipal area networks (MANs), mobile phone networks, satellite networks, cable networks, or any other suitable networks.

In some implementations, the network 110 may include both a WAN and a LAN. For instance, the WAN may include the internet. The LAN may include a network in a user's residence or workplace. In this example, the teleconference data output device 120 and the teleconference data input device 130 may communicate via the LAN. Also, either or both of the teleconference data output device 120 and the teleconference data input device 130 may communicate with the remote client device 140 via the WAN.

In some implementations, the network 110 may include one or more servers. For instance, the teleconference may be conducted via a teleconference server accessible via the network. The teleconference server may coordinate the teleconference. Coordinating the teleconference may involve, for example, authenticating the devices and/or users participating in the teleconference, logging or tracking the teleconference, receiving and/or transmitting teleconference data, or any other operations related to initiating, conducting, and terminating the teleconference.

The teleconference data output device 120 is configured to present at least some of the video and/or audio output data associated with the teleconference. For instance, the teleconference data output device 120 may present video data on the display screen 124 and/or audio data via the speakers 126. In particular embodiments, the teleconference data output device 120 may receive such output data directly from the remote client device 140 via the network 110. Alternately, or additionally, the teleconference data output device 120 may receive such output data from the remote client device 140 via the teleconference data input device 130.

According to various embodiments, the display screen 124 may display information related to the teleconference. For instance, the display screen 124 may display image or video data received from the remote client device 140. Alternately, or additionally, the display screen 124 may display a user interface for initiating, conducting, and terminating the teleconference. In particular embodiments, the display screen 124 may be located on a television. Alternately, the display screen 124 may be associated with a personal computer, laptop computer, tablet computer, or any other suitable computing device.

According to various embodiments, the speakers 126 may output sound related to the teleconference. For instance, the speakers 126 may output audio data received from the remote client device 140. Alternately, or additionally, the speakers 126 may output audio information for initiating, conducting, and terminating the teleconference. For instance, the speakers 126 may output sounds indicating that the teleconference has been initiated or terminated. In particular embodiments, the speakers 126 may be located on a television. Alternately, the speakers 126 may be associated with a personal computer, laptop computer, tablet computer, or any other suitable computing device.

In some implementations, teleconference output data may be received at both the client device teleconference data output device 120 and the teleconference data input device 130. For instance, the display screen 124 may be used to display one version of a video received from the remote client device 140, while the teleconference data input device 130 may include a second display screen for displaying a another version of the video data. Such a configuration may be desirable when, for instance, one of the two teleconference devices is equipped with a relatively larger display screen.

The teleconference data output device 130 is configured to receive at least some of the video and/or audio input data associated with the teleconference. For instance, the teleconference data input device 130 may receive video data via the camera 134 and/or audio data via the microphone 136. In particular embodiments, the teleconference data input device 130 may send at least a portion of the input data to the remote client device 140 directly via the network 140. Alternately, or additionally, the teleconference data input device 130 may send at least a portion of the input data to the remote client device 140 via the teleconference data output device 120.

According to various embodiments, the camera 134 may be any device capable of receiving video input data. The video input data may include still image data and/or moving video data. The microphone 136 may be any device capable of receiving audio input data. In particular embodiments, the camera 134 and microphone 136 may be integrated in a combined physical unit.

In some implementations, teleconference input data may be sent to both the remote client device 140 and the teleconference data output device 120. For instance, the display screen 124 may display a small "picture-in-picture" version of the video data received at the camera 134.

In particular embodiments, a system for supporting the techniques discussed herein may be configured differently than shown in FIG. 1. For example, the microphone 136 may be located at the teleconference data output device 120. As another example, the speakers 126 may be located at the teleconference data input device 130. Various configurations are possible.

According to various embodiments, the devices shown in FIG. 1 may include other components that are not explicitly depicted. For example, as discussed with respect to FIG. 5, a device may include memory and/or one or more processors. As another example, a device may include an authentication module for authenticating the device or a user of the device. As yet another example, a device may include hardware and/or software for accessing an on-demand media service configured to provide streaming media services to the device.

The teleconference data output device 120 includes a communication interface 122, and the teleconference data output device 130 includes a communication interface 130. According to various embodiments, the two communication may be the same or different. Either or both of the communications interfaces may be configured to communicate via the network 110.

In some implementations, components depicted in FIG. 1 need not be located in the same physical device. For example, the communications interface 122 may be implemented as a separate physical device communicably coupled with a television that contains the display screen 124 and the speakers 126. In this example, the communications interface 122 may be implemented on an HDMI dongle available from MobiTV of Emeryville, Calif. As another example, the camera 134 and/or microphone 136 may be implemented in one or more physically separate devices that are communicably coupled with the communications interface 132. In this example, the teleconference data input device 130 may be a computing device communicably coupled with the camera 134 and/or microphone 136, for instance via a USB port or other suitable communications port.

According to various embodiments, the teleconference data output device may not have a video camera, a microphone, display, or any other port that allows for the connection of an external camera or microphone. For instance, the teleconference output device may be a communications hardware component that connects with a display device such as a television or projector screen. The communications hardware component may provide additional functionality to the television or projector screen, such as the ability to communicate via a network. The communications hardware component may connect with the display device via a port such as HDMI. For instance, the communications hardware component may be the MobiTV Connect device available from MobiTV of Emeryville, Calif. In this configuration, the display device connected with the communications hardware component may serve to present the video conference output, while a separate device such as a phone or table may serve as the input device.

In particular embodiments, a communications hardware component may facilitate complex interactions that involve teleconference data input devices. For example, a communications hardware component connected to a display screen may be used to stream a video live stream, stream an audio stream, or execute a gaming application. When the user receives an incoming video call, the video call information is presented on the display screen. If the user accepts the incoming video call, the user may employ a phone or tablet computer as a teleconference data input device to capture audio and/or video data. Then, the communications hardware component may continue to stream audio or video or may continue to execute the gaming application while at the same time the video conference is presented on the display screen.

According to various embodiments, the server 150 may be configured to perform one or more operations for facilitating a teleconference. For example, the server 150 may authenticate one or more parties to the teleconference. As another example, the server 150 may perform presence detection and/or session management. For instance, the server 150 may maintain a record of user availability at various devices such as the teleconference data output device 120 and/or the teleconference data input device 130. Then, the server 150 may facilitate the routing of teleconference information to an appropriate device.

In particular embodiments, one or more components may be duplicated across different devices. For instance, the teleconference data input device 130 may be a smart phone, tablet computer, or laptop computer equipped with a display screen 140. However, the teleconference data output device 120 may be a television equipped with a larger display screen 124. Similarly, in some configurations the teleconference data output device 120 may be equipped with a camera and/or microphone.

According to various embodiments, a teleconference system configured to send and receive teleconference data for a user may include two or more devices. For instance, although the system configuration shown in FIG. 1 includes two devices, the teleconference data output device 120 and the teleconference data input device 130, other configurations may include different numbers of devices. In one possible configuration, a first device may be used to output teleconference data, while a second device is used to receive audio teleconference data and a third device is used to receive video teleconference data. In another possible configuration, a first device may be used to output video data and a second device may be used to output audio data, while one or more additional devices are used to receive teleconference input data.

Figure 2:
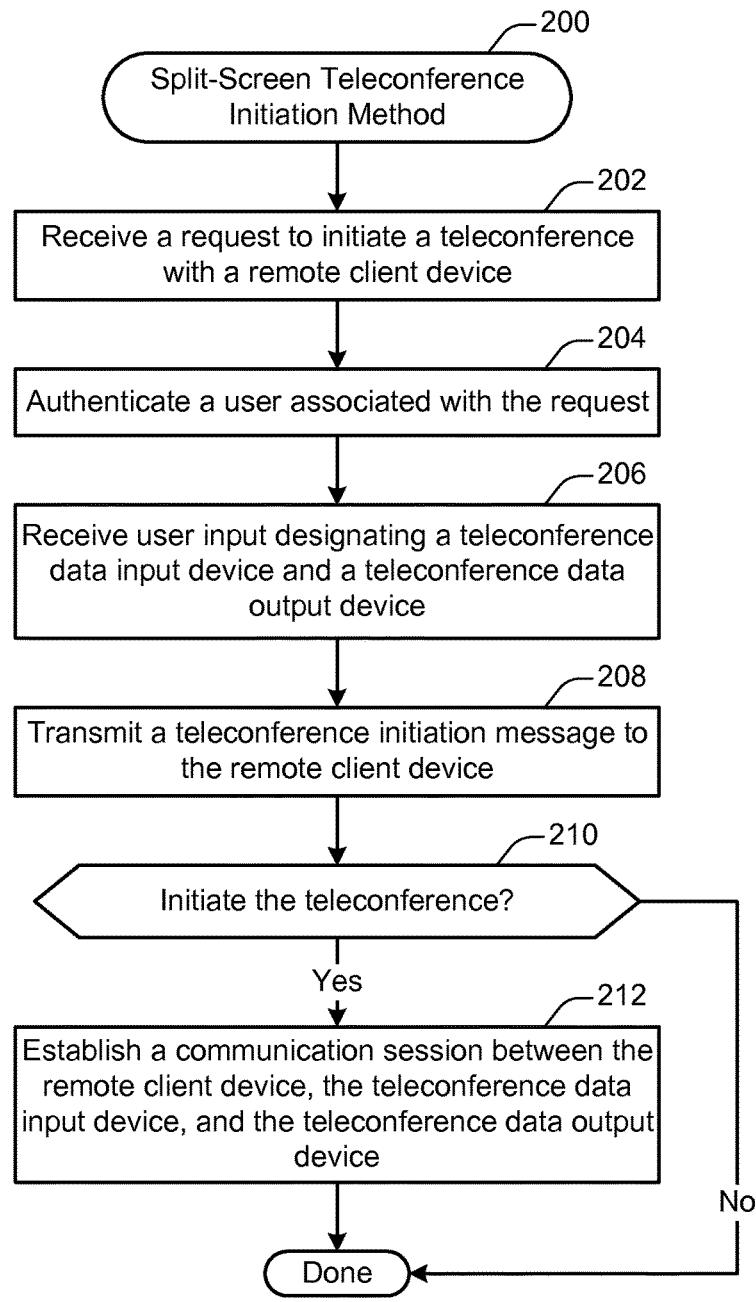
FIG. 2 illustrates an example of a method for initiating a split-screen teleconference, performed in accordance with various techniques and mechanisms of the present invention.

FIG. 2 illustrates a method 200 for initiating a split-screen teleconference. According to various embodiments, the method 200 may be performed at any of various devices such as a server, a teleconference data input device, and a teleconference data output device.

At 202, a request is received to initiate a teleconference with a remote client device. According to various embodiments, the request may be initiated at a teleconference data input device or a teleconference data output device. The request may be transmitted to a server configured to facilitate the teleconference.

At 204, a user associated with the request is authenticated. According to various embodiments, authenticating the user may involve receiving a username, a password, or any other such identifying information. In particular embodiments, a user may be authenticated by providing information to an application configured to send and/or receive teleconference data. Authentication may involve, for instance, ensuring that the user has permission to initiate a teleconference.

At 206, user input is received designating a teleconference data input device and a teleconference data output device. According to various embodiments, the user input may be provided at the device from which the request to initiate the teleconference was received at operation 202. The user input may be provided in any of a variety of ways. For instance, devices may be selected from a list, indicated based on network address, or identified in any other suitable fashion.

According to various implementations, the user input may indicate a selection of another device for including in the teleconference. For example, if the teleconference is initiated at the teleconference output device, then the user input may indicate the teleconference input device for receiving the teleconference input data. As another example, if the teleconference is initiated at the teleconference input device, then the user input may indicate the teleconference output device for presenting teleconference output data.

At 208, a teleconference initiation message is transmitted to the remote client device. According to various embodiments, the teleconference initiation message may identify the user requesting the teleconference. The teleconference initiation message may be transmitted in accordance with any suitable protocol, such as SIP or H.323.

At 210, a determination is made as to whether to initiate the teleconference. According to various embodiments, the determination may be made at least in part based on a response received from the remote client device. For example, the remote client device may transmit a message accepting or rejecting the request to initiate the teleconference. As another example, the remote client device may fail to respond to the request.

At 212, if a determination is made to initiate the teleconference, a communication session is established. According to various embodiments, the communication session may link the remote client device, the teleconference data input device, and the teleconference data output device. For instance, the communication session may be established via a protocol such as SIP or H.323. The communication session may be established by transmitting messages to the various devices in accordance with the protocol being employed.

In particular embodiments, initiating the teleconference may involve designating devices for transmitting and/or receiving information. For example, initiating the teleconference may involve transmitting a message to the remote client device instructing the remote client device to transmit teleconference data to the teleconference data output device. As another example, initiating the teleconference may involve transmitting a message to the teleconference data input device instructing the device to transmit teleconference input data to the remote client device.

Figure 3:
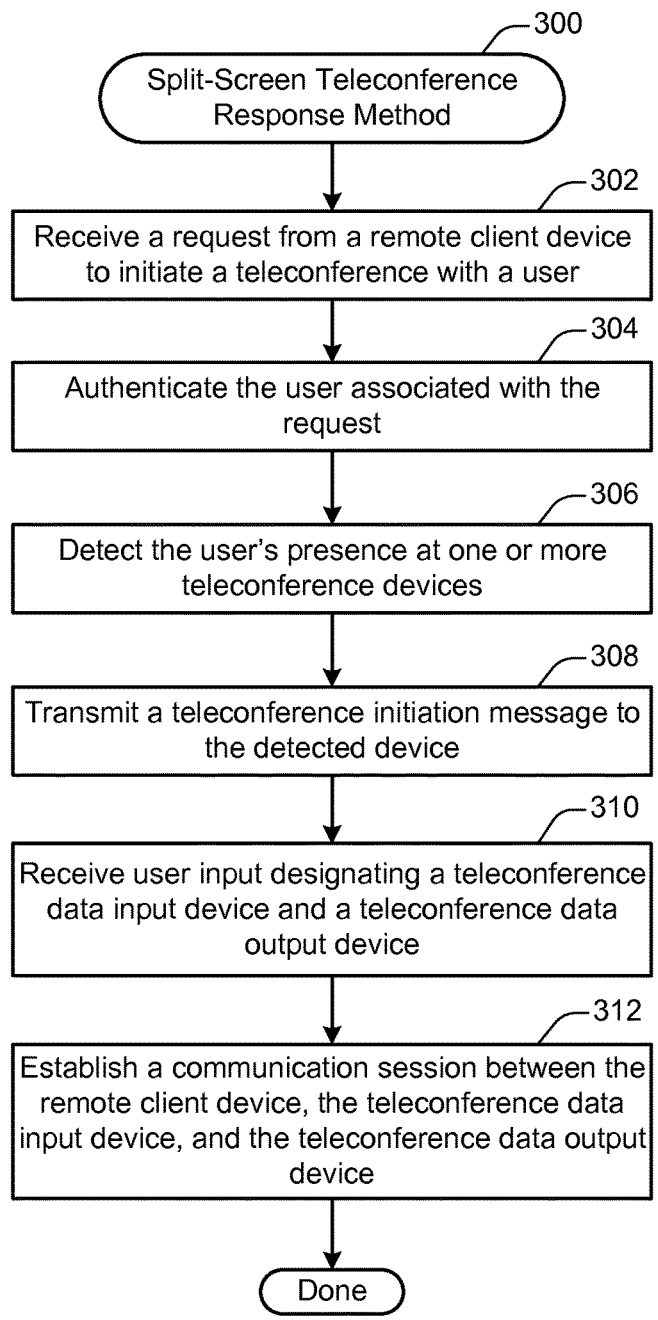
FIG. 3 illustrates an example of a method for responding to a split-screen teleconference request.

FIG. 3 illustrates a method 300 for responding to a split-screen teleconference request. According to various embodiments, the method 300 may be performed at any of various devices such as a server, a teleconference data input device, and a teleconference data output device.

At 302, a request is received from a remote client device to initiate a teleconference with a user. According to various embodiments, the request may be received at a server configured to facilitate a teleconference. Alternately, or additionally, the request may be received at a teleconference device such as the device 120 or 130 shown in FIG. 1.

At 304, the user associated with the request is authenticated. According to various embodiments, authenticating the user may involve associating the teleconference request received at operation 302 with a user of the teleconference system. For instance, the request may indicate a user identifier or username.

At 306, the user's presence at one or more teleconference devices is identified. According to various embodiments, a server may employ a presence detection protocol such as SIMPLE. The protocol may be used to determine the availability of the user on one or more devices. For instance, devices associated with the user may register for presence information and transmit notifications when events occur. For example, a teleconference device may transmit a message when activity such as user input is detected at the device. As another example, the teleconference device may transmit a message when no activity has been detected for a designated period of time.

At 308, a teleconference initiation message is transmitted to the detected device. According to various embodiments, the teleconference initiation message may identify the user requesting the teleconference. The teleconference initiation message may be transmitted in accordance with any suitable protocol, such as SIP or H.323.

At 310, user input is received designating a teleconference data input device and a teleconference data output device. According to various embodiments, the user input may be provided at the device to which the teleconference initiation message was transmitted at operation 308. The user input may be provided in any of a variety of ways. For instance, devices may be selected from a list, indicated based on network address, or identified in any other suitable fashion.

According to various implementations, the user input may indicate a selection of another device for including in the teleconference. For example, if the teleconference is initiated at the teleconference output device, then the user input may indicate the teleconference input device for receiving the teleconference input data. As another example, if the teleconference is initiated at the teleconference input device, then the user input may indicate the teleconference output device for presenting teleconference output data.

At 312, a communication session is established. According to various embodiments, the communication session may link the remote client device, the teleconference data input device, and the teleconference data output device. In particular embodiments, establishing a communication at operation 312 may be substantially similar to the establishment of a communication session at operation 212.

Figure 4:
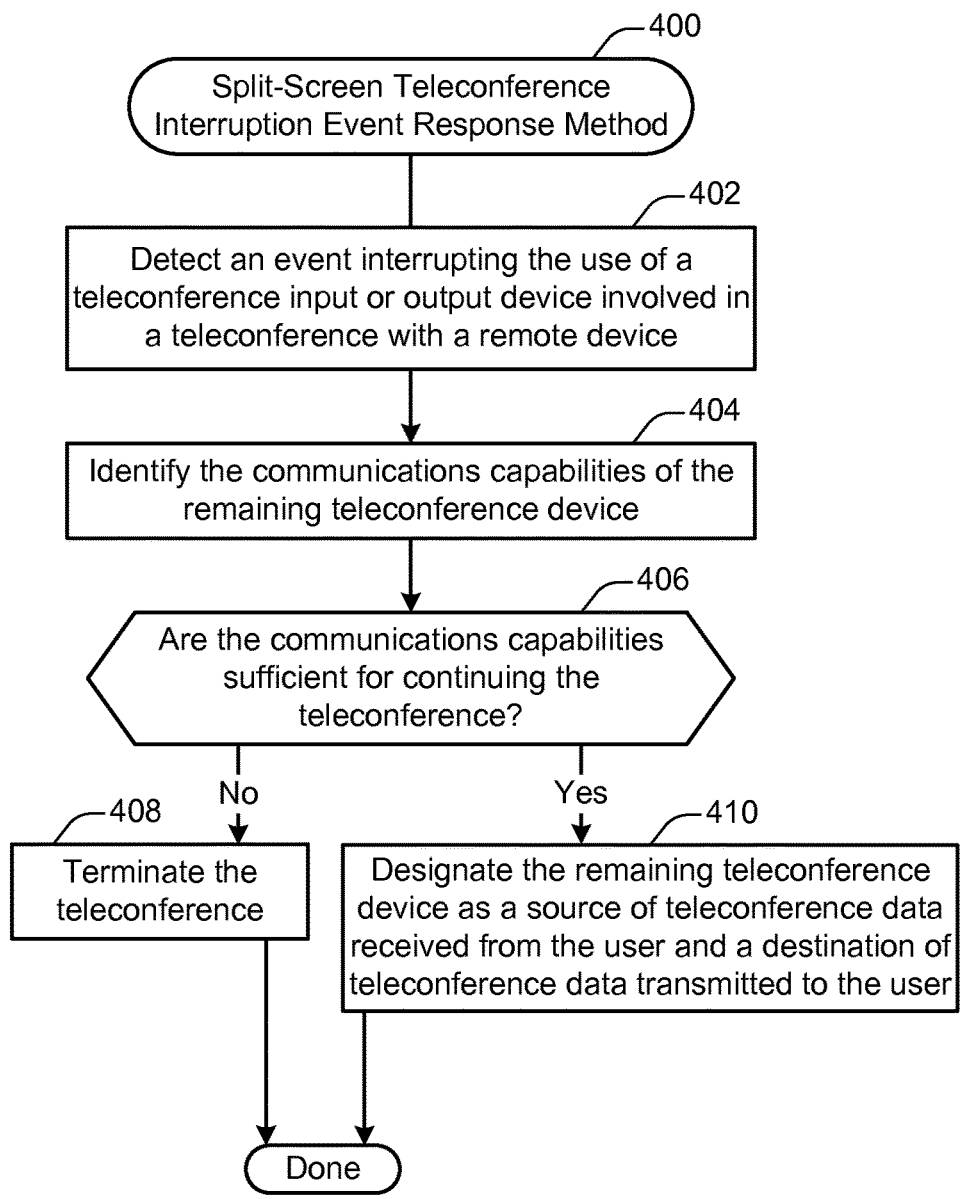
FIG. 4 illustrates an example of a method for responding to a teleconference interruption event.

FIG. 4 illustrates a method 400 of responding to a split-screen teleconference interruption event, performed in accordance with one or more embodiments. The method 400 may be performed at a server in communication with one or more teleconference devices. Alternately, or additionally, the method 400 may be performed at one or more teleconference devices.

At 402, an event is detected that interrupts the use of a teleconference input or output device involved in a teleconference with a remote device. According to various embodiments, the event may be any indication that communication between the remote device and either of the teleconference devices has been interrupted. For instance, the event may be a network communications failure, or a hardware failure at the teleconference device, and software failure at the teleconference device.

In particular embodiments, the event may be detected by determining that communications from the teleconference device have ceased. For example, a determination may be made that a teleconference data input device stopped sending teleconference input data for a designated period of time. As another example, a determination may be made that a teleconference data output device stopped acknowledging the receipt of teleconference output data messages.

At 404, the communications capabilities of the remaining teleconference device are identified. According to various embodiments, the communications capabilities may indicate whether the teleconference device is equipped with hardware and/or software to perform operations such as present and/or receive teleconference data. For example, the communications capabilities may indicate whether the remaining teleconference device includes or is connected with a camera, a microphone, a speaker, and/or a display screen.

At 406, a determination is made as to whether the communications capabilities are sufficient for continuing the teleconference. According to various embodiments, a teleconference may be associated with designated communications characteristics. For instance, the designated communications characteristics may specify one-way, two-way, or multi-way video and/or audio communication.

In particular embodiments, determining whether the communications capabilities are sufficient may involve determining whether the remaining connected teleconference device has sufficient capabilities to meet the designated communications characteristics associated with the teleconference. For example, suppose that a teleconference involves two-way audio and video communication. In this example, if communications with the teleconference data output device cease but the teleconference data input device includes hardware and software for audio and video output, then the call may be shifted entirely to the teleconference data input device. However, if instead communications with the teleconference data input device cease and the teleconference data output device does not include or communicate with a microphone and camera, then the teleconference may be terminated. Alternately, if the teleconference data output device has access to a microphone but not a camera, the teleconference may be transferred entirely to the teleconference data output device but may be continued without video communications.

In particular embodiments, the communications capabilities of a teleconference device may be registered with a server when the teleconference is initiated. Alternately, or additionally, a server or communications interface may transmit a message to the teleconference device to query the capabilities of the device.

At 408, the teleconference is terminated when the communication capabilities are insufficient for continuing the teleconference. According to various embodiments, terminating the teleconference may involve transmitting a termination message. For example, a message may be transmitted to the remote device indicating that communications with at least a portion of the teleconference system have been disrupted. As another example, a message may be transmitted to the remaining teleconference device indicating that the teleconference cannot continue without the missing device.

At 410, the remaining teleconference device is designated as a source of teleconference data received from the user and as a destination of teleconference data transmitted to the user. According to various embodiments, designating the remaining teleconference device as a source of teleconference data may involve transmitting one or more reconfiguration messages. For example, a message may be transmitted to the remote device instructing the remote device to both transmit teleconference data to and receive teleconference data from the remaining teleconference device. As another example, a similar message may be transmitted to the remaining teleconference device.

Figure 5:
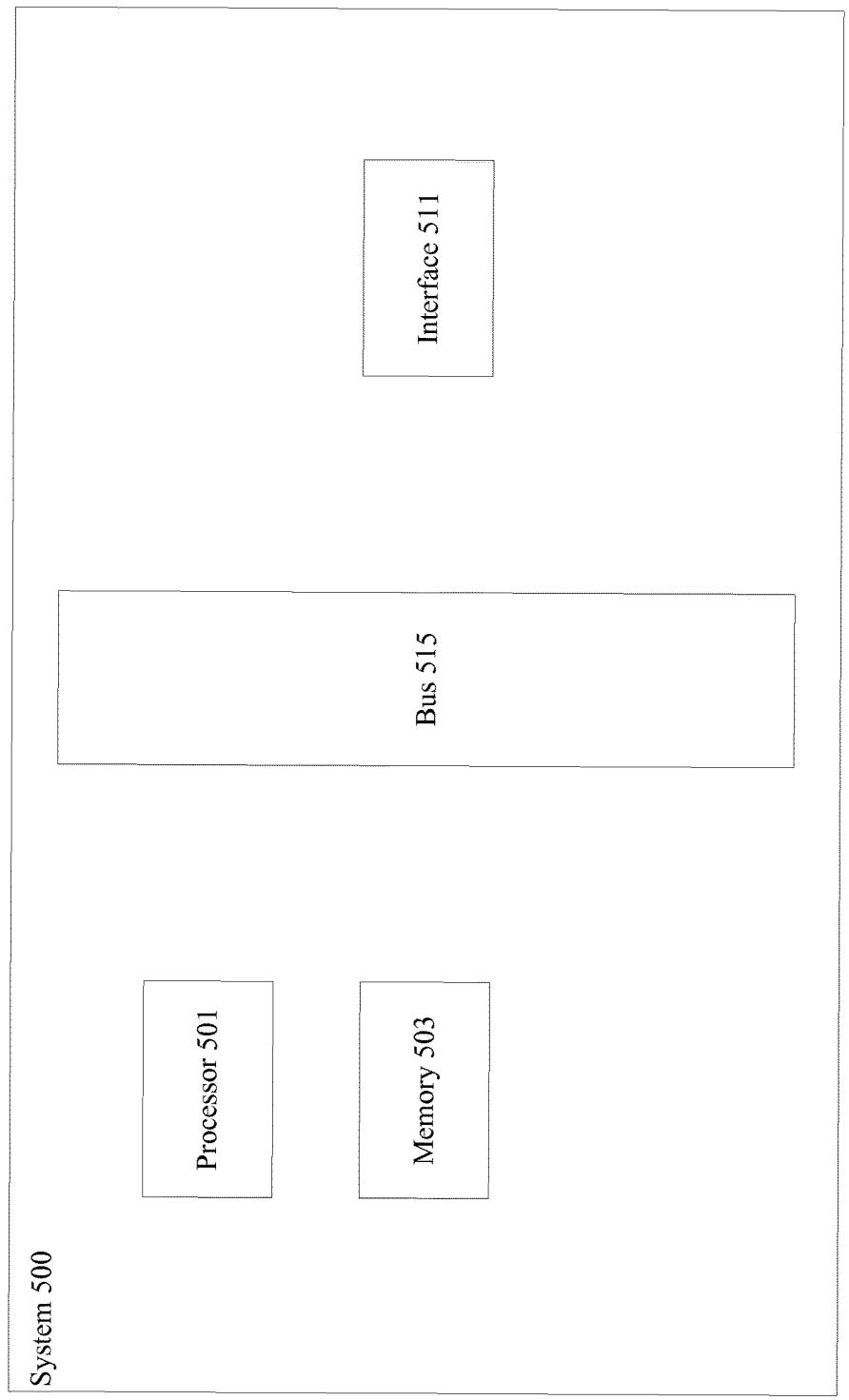
FIG. 5 illustrates an example of a system.

FIG. 5 illustrates one example of a computing device. According to particular embodiments, a system 500 suitable for implementing particular embodiments of the present invention includes a processor 501, a memory 503, an interface 511, and a bus 515 (e.g., a PCI bus or other interconnection fabric) and operates as a streaming server. When acting under the control of appropriate software or firmware, the processor 501 is responsible for facilitating a video and/or audio teleconference. Alternately, or additionally, the system 500 may be configured as a client device operable to receive and present media content items. Various specially configured devices can also be used in place of a processor 501 or in addition to processor 501. The interface 511 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

Although a particular server is described, it should be recognized that a variety of alternative configurations are possible. For example, some modules such as a report and logging module and a monitor may not be needed on every server. Alternatively, the modules may be implemented on another device connected to the server. In another example, the server may not include an interface to an abstract buy engine and may in fact include the abstract buy engine itself. A variety of configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A method comprising:
   initiating a teleconference with a first endpoint at a local teleconference system and a second endpoint at a remote client device, the local teleconference system being in communication with the remote client device via a network, the local teleconference system including a local data input device and a local data output device, the local data input device and the local data output device being physically separate, the local data input device being a smart phone, the local data output device including a television in communication with a communications hardware component via a High-Definition Multimedia Interface (HDMI) port;
   detecting activity indicating a presence of a user at the local data input device and the local data output device, wherein detecting activity indicating a presence involves receiving a first message transmitted from the local data input device via the SIP for Instant Messaging and Presence Leveraging Extensions (SIMPLE) protocol;
   transmitting teleconference input data for the first endpoint to the remote client device, the teleconference input data received at the local data input device, the local data input device residing at a first end point on the network; and
   presenting teleconference output data for the first endpoint at the local data output device, the teleconference output data received from the remote client device, the local data output device residing at a second end point on the network.

2. The method recited in claim 1, wherein initiating the teleconference comprises establishing a communications session between the local teleconference system and the remote client device.

3. The method recited in claim 2, wherein the communications session designates the local data input device as a source of the teleconference input data.

4. The method recited in claim 2, wherein the communications session designates the local data output device as a destination of the teleconference output data.

5. The method recited in claim 1, the method further comprising:
   authenticating a user associated with the teleconference.

6. The method recited in claim 1, the method further comprising:
   receiving user input selecting the local data input device and the local data output device for conducting the teleconference.

7. The method recited in claim 1, the method further comprising:
   detecting an interruption of communication with the local data output device.

8. The method recited in claim 7, further comprising:
   designating the local data input device for receiving the teleconference output data.

9. The method recited in claim 1, wherein the input data comprises video communications.

10. The method recited in claim 1, wherein the input data comprises audio communications.

11. The method recited in claim 1, wherein the output data comprises video and audio communications.

12. A system comprising:
    a communications interface configured to initiate a teleconference with a first endpoint at a local teleconference system and a second endpoint at a remote client device, the local teleconference system being in communication with the remote client device via a network;
    a local data input device configured to receive teleconference input data for the first endpoint and transmit the teleconference input data to the remote client device, the local data input device residing at a first end point on the network, the local teleconference system configured to detect activity indicating a presence of a user at the local data input device, the local data input device being a smart phone; and
    a local data output device configured to present teleconference output data for the first endpoint received from the remote client device, the local data output device residing at a second end point on the network, the local data output device being physically separate from the local data input device, the local data output device including a television in communication with a communications hardware component via a High-Definition Multimedia Interface (HDMI) port, the local teleconference system configured to detect activity indicating a presence of a user at the local data output device, wherein detecting activity indicating a presence involves receiving a first message transmitted from the local data input device via the SIP for Instant Messaging and Presence Leveraging Extensions (SIMPLE) protocol.

13. The system recited in claim 12, wherein initiating the teleconference comprises establishing a communications session between the local teleconference system and the remote client device.

14. The system recited in claim 13, wherein the communications session designates the local data input device as a source of the teleconference input data.

15. The system recited in claim 13, wherein the communications session designates the local data output device as a destination of the teleconference input data.

16. The system recited in claim 12, wherein initiating the teleconference further comprises:
authenticating a user associated with the teleconference.

17. The system recited in claim 12, wherein initiating the teleconference further comprises:
receiving user input selecting the local data input device and the local data output device for conducting the teleconference.

18. One or more non-transitory computer readable media having instructions stored thereon for performing a method, the method comprising:
initiating a teleconference with a first endpoint at a local teleconference system and a second endpoint at a remote client device, the local teleconference system being in communication with the remote client device via a network, the local teleconference system including a local data input device and a local data output device, the local data input device and the local data output device being physically separate, the local data input device being a smart phone, the local data output device including a television in communication with a communications hardware component via a High-Definition Multimedia Interface (HDMI) port;
detecting activity indicating a presence of a user at the local data input device and the local data output device, wherein detecting activity indicating a presence involves receiving a first message transmitted from the local data input device via the SIP for Instant Messaging and Presence Leveraging Extensions (SIMPLE) protocol;
transmitting teleconference input data for the first endpoint to the remote client device, the teleconference input data received at the local data input device, the local data input device residing at a first end point on the network; and
presenting teleconference output data for the first endpoint at the local data output device, the teleconference output data received from the remote client device the local data output device residing at a second end point on the network.

* * * * *